United States Patent
Yang et al.

(10) Patent No.: US 9,969,640 B2
(45) Date of Patent: May 15, 2018

(54) SLUDGE DRYING COMPOSITE CONDITIONER AND APPLICATION METHOD THEREOF

(75) Inventors: Jiakuan Yang, Shenzhen (CN); Huan Liu, Shenzhen (CN); Shu He, Shenzhen (CN); Rong Wang, Shenzhen (CN); Changzhu Yang, Shenzhen (CN); Yafei Shi, Shenzhen (CN); Yalin Li, Shenzhen (CN); Wei Mao, Shenzhen (CN)

(73) Assignees: UNIVERSTAR SCIENCE & TECHNOLOGY (SHENZHEN) CO., LTD., Shenzhen (CN); HUAZHONG UNIVERSITY OF SCIENCE & TECHNOLOGY, Wuhan (CN)

( * ) Notice: Subject to any disclaimer, the term of this patent is extended or adjusted under 35 U.S.C. 154(b) by 478 days.

(21) Appl. No.: 14/347,851

(22) PCT Filed: Mar. 29, 2012

(86) PCT No.: PCT/CN2012/073224
§ 371 (c)(1),
(2), (4) Date: Mar. 27, 2014

(87) PCT Pub. No.: WO2013/044616
PCT Pub. Date: Apr. 4, 2013

(65) Prior Publication Data
US 2014/0230267 A1     Aug. 21, 2014

(30) Foreign Application Priority Data
Sep. 28, 2011   (CN) .......................... 2011 1 0300223

(51) Int. Cl.
*B01D 21/00*   (2006.01)
*C02F 1/52*    (2006.01)
(Continued)

(52) U.S. Cl.
CPC ............... *C02F 11/14* (2013.01); *C02F 11/08* (2013.01); *C02F 2305/026* (2013.01); *Y02W 10/40* (2015.05)

(58) Field of Classification Search
None
See application file for complete search history.

(56) References Cited

U.S. PATENT DOCUMENTS

| 4,587,022 A * | 5/1986 | Shimizu ..................... B01J 2/30 210/710 |
| 6,368,511 B1 * | 4/2002 | Weissenberg ........... C02F 11/06 210/743 |

(Continued)

FOREIGN PATENT DOCUMENTS

| CN | 101759337 | 6/2010 |
| CN | 102276049 | 12/2011 |

(Continued)

OTHER PUBLICATIONS

Moreno et al. (Water Sci. Technol., 2003, 47, 145-151; Abstract only.*

(Continued)

*Primary Examiner* — Clare M Perrin
(74) *Attorney, Agent, or Firm* — Hamre, Schumann, Mueller & Larson, P.C.

(57) ABSTRACT

Provided is a sludge drying composite conditioner. The sludge drying composite conditioner comprises a Fenton's reagent or/and Fenton-like reagent and a matrix construct, the weight ratio between the Fenton's reagent or/and the Fenton-like reagent and the matrix construct is 1:0.05 to 300, and the matrix construct is powder. Further provided is an application method of the sludge drying composite conditioner, which comprises the steps of: adding a Fenton's reagent or/and Fenton-like reagent in a sludge, performing stirring and mixing, and performing an oxidation reaction;

(Continued)

Adding Fenton's reagent and/or Fenton-like reagent to the sludge slurry, mixing to carry out oxidation reaction — S01

Adding skeleton builder to the sludge slurry containing the Fenton's reagent and/or Fenton-like reagent, stirring the mixture — S02 and adding a matrix construct to the sludge added with the Fenton's reagent or/and Fenton-like reagent and performing stirring and mixing. For the sludge drying composite conditioner, through the coordinated effect of the Fenton's reagent or/and Fenton-like reagent and the powder matrix construct, the extracellular polymeric substances in the sludge are effectively damaged, the compressibility of organic matter is reduced, and the drying performance of sludge is improved. The application method thereof has a simple working process and easily controllable conditions and reduces the drying time for sludge, thereby achieving large-scale treatment of sludge.

13 Claims, 2 Drawing Sheets

(51) Int. Cl.
*C02F 1/72* (2006.01)
*C02F 11/14* (2006.01)
*C02F 1/00* (2006.01)
*B01D 15/00* (2006.01)
*C02F 1/68* (2006.01)
*B03D 3/00* (2006.01)
*C02F 11/08* (2006.01)

(56) References Cited

U.S. PATENT DOCUMENTS

2009/0008312 A1* 1/2009 Reilly .................... C02F 11/14
                                                                          210/198.1
2010/0314326 A1* 12/2010 Biotteau .............. C02F 1/5236
                                                                          210/728

FOREIGN PATENT DOCUMENTS

| CN | 102381828 | 3/2012 |
| EP | 0832853 | 4/1998 |
| WO | 03/045851 | 6/2003 |

OTHER PUBLICATIONS

Neyens et al. (Journal of Hazardous Materials, 2003, B98, pp. 91-106).*
Flood ("Milled Peat Production", pp. 1-4, accessed online Jun. 9, 2017).*
International Search Report of PCT/CN2012/073224, dated Jun. 28, 2012, 8 pages total.

* cited by examiner

Fluid

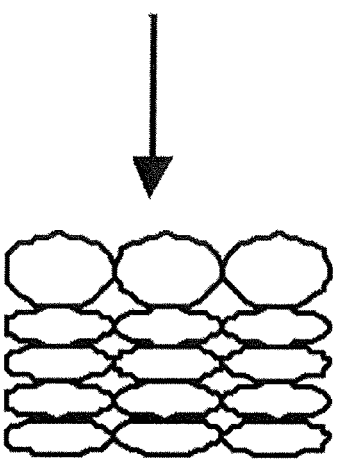

Figure 1(b)

```
┌─────────────────────────────────────────────────┐
│ Adding Fenton's reagent and/or Fenton-like      │
│ reagent to the sludge slurry, mixing to carry   │──── S01
│ out oxidation reaction                          │
└─────────────────────────────────────────────────┘
                        │
                        ▼
┌─────────────────────────────────────────────────┐
│ Adding skeleton builder to the sludge slurry    │
│ containing the Fenton's reagent and/or Fenton-  │──── S02
│ like reagent, stirring the mixture              │
└─────────────────────────────────────────────────┘
```

Figure 2

SLUDGE DRYING COMPOSITE CONDITIONER AND APPLICATION METHOD THEREOF

TECHNICAL FIELD

The present application relates to the technical field of sewage and sludge treatment, in particular, to a sludge dewatering composite conditioner and the application method thereof.

BACKGROUND

With the improving requirements on water environmental quality in China, the sewage treatment capacity is increasing year by year, so the amount of sludge as a byproduct is rising. The sludge is typically treated with conditioning and dewatering prior to further treatment such as incinerating, landfilling, composting, and recovering as building materials and the like. In the conventional wastewater treatment process, the obtained sludge typically has moisture content of up to 97%, and the sludge is a hydrophilic organic aggregate consisting mainly of extracellular polymeric substances (EPS) with villous branches and mesh structure, and the particles therein have irregular shapes and large porosity; and the sludge has high content of organic compounds, therefore it is easy to corrupt and stink; and it is difficult to dehydrate because of high moisture content.

At present, the amount of issued technical solutions for dissolving EPS is not very large. The first solution is the use of α-amylase to enhance the performance of sludge dehydration; the second one is adjusting the flocculent structure and the arrangement of the particles of the sludge by ultrasonic, changing the particle size of the sludge meanwhile recombining the particles of the sludge, and destroying the bacteria micelle structure of the sludge, so as to convert the bound water into free water and release it; the third one is adding an enzyme to make a deep dehydration to the biochemical sludge obtained in the paper industry; and the fourth technical solution is adding a composite conditioner containing potassium permanganate (fungicide), ferric chloride, lime, coal and other components, then the conditioned sludge is subjected to pressure squeezing under 6.5 MPa for 20 min, and the obtained mud cake has a moisture content below 40%. However, the present inventors have found that, in these existing solutions of physical, chemical conditioning above-mentioned only the interstitial water and capillary water can be removed, but the highly hydrated charged flocculent matrix and the EPS in the sludge cannot be destroyed, and the compression performance of the flocculent materials cannot be changed. In the existing dewatering process of sludge under filter press, the outflow passage of the sewage is blocked because of the compression of the organic matter, as a result the water contained in the floccule mesh of the sludge cannot release at maximum degree, that is, the sludge cannot be deeply dewatered.

SUMMARY

To overcome the above deficiencies of the prior art, the present application provides a sludge dewatering composite conditioner which may effectively destroy the extracellular polymeric substances of the sludge, reduce the compressibility of the organic matter, so as to improve the performance of sludge dewatering greatly.

Another object of the present application is to provide the application method of the above sludge dewatering composite conditioner.

To achieve the above objects, the present application provides the following technical solution:

A composite conditioner for sludge dewatering including: a Fenton's reagent and/or Fenton-like reagent and a skeleton builder, wherein the weight ratio of Fenton's reagent and/or Fenton-like reagent to the skeleton builder is 1:0.05 to 300; the skeleton builder is in the form of powder.

Furthermore, the application method of the above composite conditioner for sludge dewatering is provided, which comprises:

Adding a Fenton's reagent and/or Fenton-like reagent to slurry, mixing to carry out an oxidation reaction;

Adding a skeleton builder to the slurry containing the Fenton's reagent and/or Fenton-like reagent, stirring the mixture, wherein the addition amount of the skeleton builder is 5%-150% of the dry weight of the slurry.

In the above sludge dewatering composite conditioner, there is synergic action between the Fenton's reagent and/or Fenton-like reagent and the powdered skeleton builder, which can effectively destroy the extracellular polymeric substances in the sludge, reduce the compressibility of the organic compounds, therefore greatly improve the sludge dewatering performance of the composite conditioner. Wherein the advanced oxidation of the Fenton's reagent and/or Fenton-like reagent may effectively destroy the EPS, and release the water in bonded state in the sludge; the skeleton builder forms a rigid grid skeleton in the sludge, and the composite conditioner may retain a porous structure even under high pressure, thereby the problem of the organic compound being compressible may be effectively resolved, and the sludge dewatering performance may be improved. Furthermore, the skeleton builder may further destroy the flocculent structure in the sludge, release the water contained in the granules, which may break the upper limit of the traditional dehydration technologies. On the other hand, the hard particles of the skeleton may enhance the squeezing and crushing effect on the organic flocules of the sludge, enhancing the effect of dehydration.

In the application of the above sludge dewatering composite conditioning agent, a Fenton's reagent and/or Fenton like reagent and skeleton builder are added into the sludge slurry sequentially, which destruct the extracellular polymeric substances in the sludge slurry by oxidation, reduce sludge compressibility of the organic matter, achieve deep dehydration of the sludge. This application method has a simple working process and easily controllable operation conditions and reduces the dewatering time of the sludge, thereby a large-scale treatment of sludge is achieved.

BRIEF DESCRIPTION OF THE DRAWINGS

FIG. 2 is a process flow diagram of the application method of the sludge dewatering composite conditioner according to the embodiments of the present application.

DETAILED DESCRIPTION OF THE INVENTION

Figure 1A:
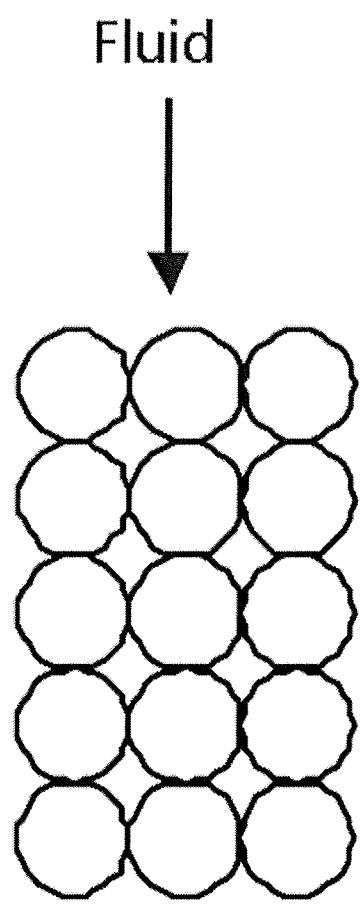
FIG. 1 is a schematic view of effect of the treated non-compressible mud cake by the process of the embodiments of the present application comparing with the treated compressible mud cake by the same process.

Objects, advantages and embodiments of the present application will be explained below in detail with reference to the accompanying drawings. However, it is to be appreciated that the following description of the embodiment(s) is merely exemplary in nature and is in no way intended to limit the application.

According to the examples of the present application, a sludge dewatering composite conditioner is provided, which may effectively destroy the extracellular polymeric substances of the sludge, reduce the compressibility of the organic matter, and improve the performance of sludge dewatering greatly. The sludge dewatering composite conditioner includes a Fenton's reagent and/or Fenton-like reagent and a skeleton builder, wherein the weight ratio of Fenton's reagent and/or Fenton-like reagent to the skeleton builder is 1:0.05-300, and the skeleton builder is in the form of powder. In the said sludge dewatering composite conditioner (sludge dewatering F—S composite conditioner), the synergic action between the Fenton's reagent and/or Fenton-like reagent and the skeleton builder in the form of powder may effectively destroy the extracellular polymeric substances of the sludge, reduce the compressibility of the organic compounds, therefore the sludge dewatering performance of the composite conditioner is greatly improved. Wherein the advanced oxidation of the Fenton's reagent and/or Fenton-like reagent can effectively destroy the extracellular polymeric substances (EPS), so as to release the bonded water in the sludge; the skeleton builder forms a rigid grid skeleton in the sludge and the composite conditioner may retain a porous structure even under high pressure, accordingly, the problem of the organic compounds being compressible may be effectively resolved and the sludge dewatering performance is improved. The skeleton builder may further destroy the flocculent structure of the sludge, so as to release the water contained in the granules, which may break the upper limit of the traditional dehydration technologies. On the other hand the hard particles of the skeleton may enhance the squeezing and crushing effect on the organic floccules of the sludge, and ensure a free flowing passage for the water of the sludge, improve the effect of dewatering, so the defects such as the water outflow passage being blocked in prior art are overcome. FIG. 1 shows the effect of the mud cake obtained from the sludge treated by the composite conditioner according to the embodiments of the present application compared with the mud cake treated by the exiting process, wherein FIG. 1(a) shows the effect of the mud cake obtained from the sludge treated by the composite conditioner according to the embodiments of the present application, and FIG. 1(b) shows the effect of the mud cake obtained from the sludge treated by the existing process. Referring to FIG. 1, in the compressing process of the sludge treated by the composite conditioner according to the embodiments of the present application, the rigid grid skeleton in the sludge ensures an unblocked outflow passage for the water in the sludge, so as to maximize the removal of moisture, and achieve a deep dehydration of the sludge. While in the compressing process of sludge treated by conventional process, the organic matters are compressed and deformed, thereby the passage of water filtration is blocked, and the water cannot flow out. The test results show that, after the conditioning and dehydration by means of the above sludge dewatering composite conditioner, the reduction rate of the specific resistance of the sludge is more than 80%, the reduction rate of the capillary suction time (CST) is more than 50%, the moisture content of the obtained mud cake declines to 30%-60%.

Specifically, when the sludge dewatering composite conditioner of the present application includes the above-described Fenton's reagent therein, the Fenton's reagent preferably comprises the following three components:

the first component: one or more selected from the group consisting of HCl, $H_2SO_4$, $HNO_3$ and $CH_3COOH$;

the second component: $FeCl_2$ and/or $FeSO_4$;

the third component: $H_2O_2$;

wherein, on the basis of the dry weight of the sludge, the amount of the second component is 0.5% to 50% by weight of the dry sludge, and the amount of the third component is 0.1% to 60% by weight of the dry sludge.

Alternatively or additionally, when the sludge dewatering composite conditioner of the present application contains the above-described Fenton-like reagent therein, the said Fenton-like reagent preferably comprises the following three components:

the fourth component: one or more selected from the group consisting of HCl, $H_2SO_4$, $HNO_3$ and $CH_3COOH$;

the fifth component: one or more selected from the group consisting of $FeCl_3$, $Fe_2(SO_4)_3$, $CuCl_2$, $CuSO_4$, $ZnCl_2$, and $ZnSO_4$;

the sixth component: $H_2O_2$;

wherein, on the basis of the dry weight of the sludge, the amount of the fifth component is 0.5% to 50% by weight of the dry sludge, and the amount of the sixth component is 0.1% to 60% by weight of the dry sludge.

The above preferred Fenton's reagent and/or Fenton-like reagent can induce oxidation and destruction to the EPS in the flocculent matrix of the sludge, so as to break the EPS. Meanwhile, the above-mentioned preferred Fenton's reagent and/or Fenton-like reagent can induce an oxidization of the organic compounds dissolved in the sewage and make a degradation of the toxic organic compounds simultaneously, thereby the pollutants will be completely decomposed into harmless compounds, such as $CO_2$, $H_2O$, and inorganic salts, so the hazards of the sewage obtained from the sludge dewatering to the environment is further reduced. Wherein, the first component and/or the fourth component provides a favorable reaction environment for the oxidation reaction of the Fenton's reagent/Fenton-like reagent, which improves the efficiency of the oxidation reaction; and the second component and/or the fifth component can effectively stimulate the catalysis of the third component and/or the sixth component, i.e. $H_2O_2$ which decomposes into .OH with high activity.

The oxidation process of the above Fenton's reagent is specifically as follows:

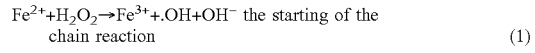

$k_1 \approx 70 M^{-1}s^{-1}$

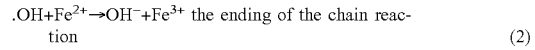

$k_2 = 3.2 \times 10^8 M^{-1}s^{-1}$

The detail oxidation process of the above Fenton-like reagent is as follows:

$$Fe^{3+}+H_2O_2 \leftrightarrows Fe\text{—}OOH^{2+}+H^+ \tag{3}$$

$k_3 = 0.001\text{–}0.01 M^{-1}s^{-1}$ $$Fe\text{—}OOH^{2+} \rightarrow HO_2\cdot + Fe^{2+} \tag{4}$$

$k_5 = 1.3 \times 10^6 M^{-1}s^{-1} (pH=3)$ $$Fe^{3+}+HO_2\cdot \rightarrow Fe^{2+}+O_2+H^+ \quad (6)$$

$$k_6=1.2\times 10^6 M^{-1}s^{-1}(pH=3)$$

$$\cdot OH+H_2O_2\rightarrow H_2O+HO_2\cdot \quad (7)$$

$$k_7=3.3\times 10^7 M^{-1}s^{-1}$$

wherein the .OH can react with an aromatic ring or heterocyclic ring (and an unsaturated alkene or alkyne) on a carbon chain. And the .OH may further make oxidation on the organic compound by attracting the proton to produce R.:

$$RH+\cdot OH\rightarrow H_2O+R\cdot \rightarrow deep\ oxidation \quad (8)$$

If there is no restriction on the concentration of the reactants, all the organic compounds will be completely decomposed into $H_2O$, $CO_2$, and inorganic salts. The R. generated in the reaction (8) may be oxidized into $Fe^{3+}$:

$$R\cdot +Fe^{3+}\rightarrow R^+ +Fe^{2+} \quad (9)$$

The Fenton reaction chain consists of reactions (1), (2), (8), and (9), wherein the $Fe^{3+}$ obtained in the reactions (1) and (2) may catalyze $H_2O_2$ to form $H_2O$ and $O_2$, which is so called "Fenton-like reaction".

Specifically, the skeleton builder is substantially fine aggregate in the form of powder, the skeleton builder consists of inert materials which do not contribute to coagulation, so they are also known as physical conditioner. The skeleton builder is preferably one or more selected from the group consisting of lime, fly ash, magnesite, dead burned magnesia, waste fly ash, biomass particles, red mud, cement, phosphogypsum, gypsum, carbon powder, coal dust. The preferred skeleton builder can form rigid grid skeleton in the sludge, which can destroy the flocculent structure of the sludge, thereby the problem of the organic matter being compressible in the sludge may be solved, and the outflow passage of the sewage from the sludge is unblocked. In addition, the preferred skeleton builder also fixes the heavy metals to a certain level, change the pH condition of the sludge for a long period, prevent or significantly delay the microbial reactions between the smelly components and the bacterial pollution sources, leading to the inactivation of the microbial population in the sludge, thus reducing the generation of the toxic substances. For example, when the skeleton builder is lime, it can increase the PH of the sludge to create a basic condition while generate heat. This high pH can convert the soluble metal ions into insoluble metal hydroxides, so as to fix the heavy metals to a certain degree.

The main reaction process is as follows:

$$CaO+H_2O=Ca(OH)_2+Heat \quad (10)$$

$$Ca^{2+}+2HCO_3^-+CaO\rightarrow 2CaCO_3+H_2O \quad (11)$$

$$2PO_4^{3-}+6H^+ +3CaO\rightarrow Ca_3(PO_4)_2+3H_2O \quad (12)$$

$$CO_2+CaO\rightarrow CaCO_3 \quad (13)$$

$$organic\ acid\ (RCOOH)+CaO\rightarrow RCOOHCaOH \quad (14)$$

$$Fat+CaO\rightarrow fatty\ acid \quad (15)$$

When the sludge dewatering composite conditioner according to the embodiments of the present application contains Fenton-like reagent, the iron ions react with the lime to produce $Fe(OH)_3$, which has very strong adsorption capacity to the activated sludge particles, so as to significantly increase the degree of dehydration.

Furthermore, the present application provides the application method of the above sludge dewatering composite conditioner. The application process of the composite conditioner for sludge dewatering is shown in FIG. 2, which comprises:

step S01: adding a Fenton's reagent and/or Fenton-like reagent to slurry, carrying out an oxidation reaction under mixing;

step S02: adding a skeleton builder to the slurry containing the Fenton's reagent and/or Fenton-like reagent, and stirring the mixture, wherein the addition amount of the skeleton builder is 5%-150% of the dry weight of the slurry.

In particular, in the above step S01, the sludge slurry may have different properties, and come from different sources, such as blended sludge (water content of 95% to 99%), dehydrated sludge (water content of about 80%), paper sludge and the like. In order to make the Fenton's reagent and/or Fenton-like reagent added in step S01 and the skeleton builder in step S02 mix and react with the sludge sufficiently, when a sludge of low moisture content, e.g. PAM dewatered sludge, is selected, this sludge should be added water to a water content of 90 wt % to 99 wt %, then the sludge is pulpified.

In the step S01, the formulations of the Fenton's reagent and Fenton-like reagent have been described above, they will not be repeated again here. Wherein the step of adding Fenton's reagent and/or Fenton like reagent into the sludge is preferably in the following sequence:

step S011: adding the first component and/or the fourth component into the sludge, and adjusting the PH to 2 to 7;

step S012: adding the second component and/or the fifth component into the said sludge of PH of 2 to 7, then stirring for 1 to 3 minutes;

step S013: adding the third component and/or the sixth component into the said sludge containing the second component and/or the fifth component, then stirring for 10 to 90 minutes.

This preferred adding sequence of the Fenton's reagent and/or Fenton-like reagent into the sludge makes the oxygen reaction between the Fenton's reagent and/or Fenton-like reagent and the associated materials in the sludge proceed sufficiently, which reaction destructs the EPS more completely, and releases the bonded water out.

In the above step S02, the period for stirring the skeleton builder is preferably 1-20 min, this period may mix the skeleton builder and the sludge sufficiently, and destruct the flocculent structure in the sludge completely. The above mentioned skeleton builder is preferred.

Furthermore, the specific constituents of the skeleton builder in the step S02 may be selected flexibly based on the subsequent disposal process, if only this selection is in favor of incineration, landfill, composting, converting into building materials and the like.

In the above application method of the sludge dewatering composite conditioner, the Fenton's reagent and/or Fenton like reagent and skeleton builder are added into the sludge sequentially, so as to oxidize and destruct the extracellular polymeric substances in the sludge, reduce the compressibility of the organic matters in the sludge, and achieve the deep dehydration of the sludge. This application method has a simple working process and easily controllable operation conditions and reduces the dewatering time of the sludge, increases the efficiency of sludge treatment and reduces the cost of sludge treatment, thereby a large-scale treatment of sludge is achieved.

The present application will now be illustrated in detail by the Examples of specific sludge dewatering composite conditioner and the application method thereof.

EXAMPLE 1

A composite conditioner for sludge dewatering including Fenton's reagent and skeleton builder in the weight ratio of 18:23 was prepared, wherein the Fenton's reagent contained a Fenton system of $H_2SO_4/FeSO_4/H_2O_2$, and the skeleton builder was the powder of lime.

The application process of the above composite conditioner for sludge dewatering was as follows:

step S11: a mixed sludge with water content of 99.0% was obtained from a municipal sewage plant, then the Fenton's reagent of $H_2SO_4/FeSO_4/H_2O_2$ was added into the sludge, the steps of adding the Fenton's reagent was as follows:

Step S111: an aqueous $H_2SO_4$ solution of 50% concentration was added to the concentrated sludge of 96.0% water content, thereby the pH of the sludge was adjusted to 5;

Step S112: an aqueous $FeSO_4$ solution was added to the sludge of pH 5, the addition amount of the $FeSO_4$ is 3.0 wt % of the dry weight of the sludge, the obtained mixture was stirred for 2 minutes to mix the $FeSO_4$ and sludge completely;

Step S113: to the obtained sludge $H_2O_2$ was added, wherein the addition amount of the $H_2O_2$ is 12.5 wt % of the dry weight of the sludge, and the mixture was stirred for 50 minutes, so that the sludge mixed with Fenton's reagent sufficiently, during that time the oxidation reaction took place;

Step S12: to the obtained sludge a lime powder of 23% weight of the dry weight of the sludge was added, the mixture was stirred to homogeneity.

The pretreated sludge obtained by the above steps in this Example was subjected to plate and frame filter press dewatering treatment, then the specific resistance and the capillary suction time (CST) of the sludge was measured, wherein the measurement method for the specific resistance of the sludge was: carrying out a sludge dewatering test under a vacuum of 0.08 MPa. The filtering time t and the corresponding filtrate volume V and the total volume of the filtrate were recorded, then the specific resistance of the sludge was calculated. The measurement method for the capillary suction time (CST) of the sludge was: taking a CST instrument (304M, Triton Electronics), turning on the instrument, pressing the 'reset' button, and adding a small amount of sludge sample into a funnel (d=10 mm), starting the timing when the first alarm sounds, and stopping the timing when the second alarm sounds, and reading the CST values on the display. It was determined that, the specific resistance of the dewatered sludge was reduced by 88.5%, the CST was reduced by 58%.

EXAMPLE 2

A composite conditioner for sludge dewatering including Fenton's reagent and skeleton builder in the weight ratio of 17:23 was prepared, wherein the Fenton's reagent contained a Fenton system of $H_2SO_4/FeSO_4/H_2O_2$, and the skeleton builder was the mixed powder of lime and red mud in the weight ratio of 1:1.

The application process of the composite conditioner was similar to the step S11 to step S12 in Example 1, but only different in: the sludge was concentrated to the water content of 95.9%; and the concentration of the $H_2SO_4$ solution was 98%, thereby the pH of the sludge was adjusted to 3.5; after the addition of the mixed powder of lime and red mud the mixture was stirred to homogeneity.

After the plate and frame filter press dewatering treatment to the above pretreated sludge obtained by the above steps in this Example, the specific resistance of the dewatered sludge was reduced by 89%, the CST was reduced by 61%.

EXAMPLE 3

A composite conditioner for sludge dewatering including Fenton's reagent and skeleton builder in the weight ratio of 17:23 was prepared, wherein the Fenton's reagent contained a Fenton system of $H_2SO_4/FeSO_4/H_2O_2$, and the skeleton builder was the mixed powder of lime and phosphogypsum in the weight ratio of 1:1.

The application process of the composite conditioner was similar to the steps S11 to S12 of Example 1, but only different in: the sludge was concentrated to the water content of 95.9% and the concentration of the $H_2SO_4$ solution was 98% and the pH of the sludge was adjusted to 5, after the addition of the mixed powder of lime and phosphogypsum the mixture was stirred to homogeneity.

After the plate and frame filter press dewatering treatment to the pretreated sludge obtained in this Example, the specific resistance of the dewatered sludge was reduced by 90% the CST was reduced by 63%.

EXAMPLE 4

A composite conditioner for sludge dewatering including Fenton's reagent and skeleton builder in the weight ratio of 16:30 was prepared, wherein the Fenton's reagent contained a Fenton system of $H_2SO_4/FeSO_4/H_2O_2$, and the skeleton builder was cement.

The application process of the composite conditioner was similar to the steps S11 to S12 of Example 1 but only different in: the sludge was concentrated to the water content of 96.4%, the concentration of the $H_2SO_4$ solution was 98%, and the pH of the sludge was adjusted to 5; the addition amount of the cement was 30 wt % of the dry weight of the sludge, after the addition of the cement the sludge was stirred to homogeneity.

After the plate and frame filter press dewatering treatment to the pretreated sludge obtained in this Example, the specific resistance of the dewatered sludge was reduced by 90%, and the CST was reduced by 62%.

EXAMPLE 5

A composite conditioner for sludge dewatering including Fenton like reagent and skeleton builder in the weight ratio of 95:50 was prepared, wherein the Fenton like reagent contained a Fenton system of $HNO_3/CuSO_4/H_2O_2$, and the skeleton builder was the mixed powder of magnesite and biomass particles in the weight ratio of 1:1.

The application process of the composite conditioner was similar to the steps S11 to S12 of Example 1 but only different in: the sludge was concentrated to the water content of 97.2%, the concentration of the $HNO_3$ solution was 20%, and the pH of the sludge was adjusted to 4; the addition amounts of the $CuSO_4$ and $H_2O_2$ were 39 wt % and 45 wt % of the dry weight of the sludge respectively, after the addition of the $CuSO_4$ the mixture was stirred for 3 minutes and after the $H_2O_2$ it was stirred for 90 minutes, and the total addition amount of the mixed powder of the magnesite and biomass particles was 50 wt % of the dry weight of the sludge, then the sludge was stirred to homogeneity.

After the plate and frame filter press dewatering treatment to the pretreated sludge obtained in this Example, the specific resistance of the dewatered sludge was reduced by 87%, and the CST was reduced by 57%.

EXAMPLE 6

A composite conditioner for sludge dewatering including Fenton like reagent and skeleton builder in the weight ratio of 34:50 was prepared, wherein the Fenton like reagent contained a Fenton system of $HNO_3/CuSO_4/H_2O_2$, and the skeleton builder was the mixed powder of magnesite and phosphogypsum in the weight ratio of 1:3.

The application process of the composite conditioner was similar to the steps S11 to S12 of Example 1 but only different in: the concentration of the $HNO_3$ solution was 70% and the pH of the sludge was adjusted to 2; the addition amounts of the $CuSO_4$ and $H_2O_2$ were 5.4 wt % and 25 wt % of the dry weight of the sludge respectively; the addition amount of the mixed powder of the magnesite and phosphogypsum was 50 wt % of the dry weight of the sludge, after the addition of the mixed powder of magnesite and phosphogypsum the obtained sludge was stirred to homogeneity.

The pretreated sludge obtained in this Example was subjected to plate and frame filter press dewatering treatment, wherein the sludge was pressed under 0.9 MPa for 40 minutes, the dewatered mud cake had a moisture content of 53.5%. After standing for a week, the moisture content of the mud cake reduced to 10.9%.

EXAMPLE 7

A composite conditioner for sludge dewatering including Fenton's reagent and skeleton builder in the weight ratio of 1.5:50 was prepared, wherein the Fenton's reagent contained a Fenton system of $H_2SO_4/FeSO_4/H_2O_2$, and the skeleton builder was the mixed powder of waste fly ash and magnesite in the weight ratio of 5:1.

The application process of the composite conditioner was similar to the steps S11 to S12 of Example 1 but only different in: the concentration of the $H_2SO_4$ solution was 30%, and the pH of the sludge was adjusted to 4, the addition amounts of the $FeSO_4$ and $H_2O_2$ were 0.5 wt % and 0.5 wt % of the dry weight of the sludge respectively, after the addition of the $FeSO_4$ the mixture was stirred for 1 minute and after the and $H_2O_2$ it was stirred for 90 minutes; and the total addition amount of the mixed powder of the waste fly ash and magnesite was 50 wt % of the dry weight of the sludge, after the addition of the waste fly ash and magnesite, the obtained mixture was stirred to homogeneity.

The pretreated sludge obtained in this Example was subjected to plate and frame filter press dewatering treatment, wherein the sludge was squeezed under the pressure of 0.9 MPa for 40 minutes, then the sludge was membrane squeezed under the pressure of 1.1 MPa for 5 minutes, then the dewatered mud cake had a moisture content of 48.6%. After standing for a week, the moisture content of the mud cake reduced to 9.5%.

EXAMPLE 8

A composite conditioner for sludge dewatering including Fenton's reagent and skeleton builder in the weight ratio of 85:20 was prepared, wherein the Fenton's reagent contained a Fenton system of $HCl/FeCl_2/H_2O_2$, and the skeleton builder is the mixed powder of lime and phosphogypsum in the weight ratio of 5:1.

The application process of the composite conditioner was similar to the steps S11 to S12 of Example 1 but only different in: the sludge was concentrated to the water content of 95.6%, the concentration of the HCl solution was 10%, and the pH of the sludge was adjusted to 6; the addition amounts of the $FeCl_2$ and $H_2O_2$ were 48 wt % and 35 wt % respectively, after the addition of the $FeCl_2$ the obtained mixture was stirred for 1 minute and after the and $H_2O_2$ it was stirred for 40 minutes; the addition amount of the mixed powder of the lime and phosphogypsum was 20 wt % of the dry weight of the sludge, after the addition of the lime and phosphogypsum the obtained mixture was stirred to homogeneity.

The pretreated sludge obtained in this Example was subjected to plate and frame filter press dewatering treatment, wherein the sludge was squeezed under the pressure of 0.9 MPa for 40 minutes, then the sludge was membrane squeezed under the pressure of 1.1 MPa for 5 minutes, the dewatered mud cake had a moisture content of 40.6%. After standing for a week, the moisture content of the mud cake reduced to 10.1%.

EXAMPLE 9

A composite conditioner for sludge dewatering including Fenton like reagent and skeleton builder in the weight ratio of 80:16 was prepared, wherein the Fenton like reagent contained a Fenton system of $CH_3COOH/Fe_2(SO_4)_3/H_2O_2$, and the skeleton builder was the mixed powder of magnesite and cement in the weight ratio of 2:1.

The application process of the composite conditioner was similar to the steps S11 to S12 of Example 1 but only different in: the sludge with a water content of 80.0% was pulpified to the water content of 95%, the concentration of the $CH_3COOH$ solution was 80% and the pH of the sludge was adjusted to 6.5; the addition amounts of the $Fe_2(SO_4)_3$ and $H_2O_2$ were 15 wt % and 60 wt % of the dry weight of the sludge respectively, after the addition of the $Fe_2(SO_4)_3$ the obtained mixture was stirred for 2 minutes and after the $H_2O_2$ it was stirred for 80 minutes, and the total addition amount of the mixed powder of the magnesite and cement was 16 wt % of the dry weight of the sludge, then the sludge was stirred to homogeneity.

The pretreated sludge obtained in this Example was subjected to plate and frame filter press dewatering treatment, wherein the sludge was squeezed under 0 to 1.0 MPa for 40 minutes, then the sludge was membrane squeezed under 1.2 to 1.7 Mpa for 30 minutes, the dewatered sludge had a moisture content of 57.5%.

EXAMPLE 10

A composite conditioner for sludge dewatering including Fenton like reagent and skeleton builder in the weight ratio of 28:75 was prepared, wherein the Fenton like reagent contained a Fenton system of $H_2SO_4/ZnSO_4/H_2O_2$, and the skeleton builder was the mixed powder of coal dust and lime in the weight ratio of 2:1.

The application process of the composite conditioner was similar to the steps S11 to S12 of Example 1 but only different in: the sludge with a water content of 80.7% was pulpified to the water content of 93%, the concentration of the $H_2SO_4$ solution was 30% and the pH of the sludge was adjusted to 4, the addition amounts of the $ZnSO_4$ and $H_2O_2$ were 19 wt % and 6 wt % of the dry weight of the sludge respectively, after the addition of the $Fe_2(SO_4)_3$ the obtained mixture was stirred for 2 minutes and after the $H_2O_2$ it was stirred for 90 minutes, and the total addition amount of the mixed powder of the coat dust and lime was 75 wt % of the dry weight of the sludge then the sludge was stirred to homogeneity.

The pretreated sludge obtained in this Example was subjected to plate and frame filter press dewatering treatment, wherein the sludge was squeezed under 0.3 to 0.7 Mpa for 42 minutes, then the sludge was membrane squeezed under 0.7 to 5.0 Mpa for 30 minutes, the dewatered sludge had a moisture content of 46.7%.

EXAMPLE 11

A composite conditioner for sludge dewatering including Fenton's reagent and skeleton builder in the weight ratio of 15:50 was prepared, wherein the Fenton's reagent contained a Fenton system of $HCl/FeCl_2/H_2O_2$, and the skeleton builder is the mixed powder of magnesite and fly ash in the weight ratio of 2:1.

The application process of the composite conditioner was similar to the steps S11 to S12 of Example 1 but only different in: the paper plant sludge with water content of 79.0% to 85.0% was pulpified to the water content of water content of 90%; the concentration of the HCl solution was 20% and the pH of the sludge was adjusted to 4, the addition amounts of the $FeCl_2$ and $H_2O_2$ were 10 wt % and 4 wt % of the dry weight of the sludge respectively, after the addition of the $FeCl_2$ the obtained sludge was stirred for 1 minute and after the addition of the $H_2O_2$ it was stirred for 20 minutes, the total addition amount of the mixed powder of the magnesite and fly ash was 50 wt % of the dry weight of the sludge then the obtained sludge was stirred to homogeneity.

The pretreated sludge obtained in this Example was subjected to plate and frame filter press dewatering treatment, wherein the sludge was squeezed under the pressure of 0.4 to 0.8 MPa for 25 minutes, then the sludge was membrane squeezed under the pressure of 1.5 MPa for 15 minutes then the dewatered mud cake had a moisture content of 31.4%.

EXAMPLE 12

A composite conditioner for sludge dewatering including Fenton's reagent and skeleton builder in the weight ratio of 20:40 was prepared, wherein the Fenton's reagent contained a Fenton system of $HCl/FeCl_2/H_2O_2$, and the skeleton builder is the powder of biomass particles, carbon powder and coal dust in the weight ratio of 3:2:5.

The application process of the composite conditioner was similar to, the steps S11 to S12 of Example 1 but only different in: the paper plant sludge with water content of 79.0% to 85.0% was pulpified to the water content of 95%; the concentration of the HCl solution was 20% and the pH of the sludge was adjusted to 4, the addition amounts of the $FeCl_2$ and $H_2O_2$ were 10 wt % and 4 wt % of the dry weight of the sludge respectively, after the addition of the $FeCl_2$ the obtained sludge was stirred for 1 minute and after the addition of the $H_2O_2$ it was stirred for 20 minutes; the total addition amount of the mixed powder of the biomass particles, carbon powder and coal dust was 40 wt % of the dry weight of the sludge then the sludge was stirred to homogeneity.

The pretreated sludge obtained in this Example was subjected to plate and frame filter press dewatering treatment, wherein the sludge was squeezed under the pressure of 0.4 to 0.8 MPa for 25 minutes, then the sludge was membrane squeezed under the pressure of 1.5 MPa for 15 minutes, then the dewatered mud cake had a moisture content of 55%.

EXAMPLE 13

A composite conditioner for sludge dewatering including Fenton's reagent and skeleton builder in the weight ratio of 1.5:300 was prepared, wherein the Fenton's reagent contained a Fenton system of $HCl/FeCl_2/H_2O_2$, and the skeleton builder is the mixed powder of biomass particles, carbon powder and coal dust in the weight ratio of 3:2:5.

The application process of the composite conditioner was similar to the steps S11 to S12 of Example 1 but only different in: the paper plant sludge with water content of 79.0% to 85.0% was pulpified to the water content of 90%, the concentration of the HCl solution was 20%, and the pH of the sludge was adjusted to 7; the addition amounts of the $FeCl_2$ and $H_2O_2$ were 0.35 wt % and 0.25 wt % of the dry weight of the sludge respectively, after the addition of the $FeCl_2$ the obtained sludge was stirred for 1 minute and after the addition of the $H_2O_2$ it was stirred for 20 minutes, the total addition amount of the mixed powder of the biomass particles, carbon powder and coal dust was 150 wt % of the dry weight of the sludge then the sludge was stirred to homogeneity.

The above pretreated sludge obtained in this Example was subjected to plate and frame filter press dewatering treatment, wherein the sludge was squeezed under the pressure of 0.4 to 0.8 MPa for 25 minutes, then the sludge was membrane squeezed under the pressure of 1.5 MPa for 15 minutes, and the dewatered mud cake had a moisture content of 45.2%.

EXAMPLE 14

A composite conditioner for sludge dewatering including Fenton's reagent and skeleton builder in the weight ratio of 100:5 was prepared, wherein the Fenton's reagent contained a Fenton system of $HCl/FeCl_2/H_2O_2$, and the skeleton builder is the mixed powder of lime and phosphogypsum in the weight ratio of 5:1.

The application process of the composite conditioner was similar to the steps S11 to S12 of Example 1 but only different in: the sludge was concentrated to the water content of 95.6%, the concentration of the HCl solution was 10%, and the pH of the sludge was adjusted to 2; the addition amounts of the $FeCl_2$ and $H_2O_2$ were 55 wt % and 35 wt % of the dry weight of the sludge respectively, after the addition of the $FeCl_2$ the obtained sludge was stirred for 1 minute, and after the addition of the and $H_2O_2$ it was stirred for 40 minutes; and the total addition amount of the mixed powder of the lime and phosphogypsum was 5 wt % of the dry weight of the sludge, then the sludge was stirred to homogeneity.

The pretreated sludge obtained in this Example was subjected to plate and frame filter press dewatering treatment, wherein the sludge was squeezed under the pressure of 0.4 to 0.8 Mpa for 25 minutes, then the sludge was membrane squeezed under the pressure of 1.5 MPa for 15 minutes, then the dewatered mud cake had a moisture content of 59.1%.

The embodiments above are merely the preferable embodiments of the present application and not intended to limit the present application. And all changes, equivalent substitution and improvements which come within the meaning and range of equivalency of the present application are intended to be embraced therein.

What is claimed is:

1. A sludge dewatering composite conditioner, comprising:
   a Fenton's reagent and/or a Fenton-like reagent; and
   a skeleton builder,
   wherein the Fenton's reagent comprises:
   a first component that is one or more selected from the group consisting of HCl, $H_2SO_4$, $HNO_3$ and $CH_3COOH$;
   a second component that is $FeCl_2$ and/or $FeSO_4$; and
   a third component that is $H_2O_2$,
   wherein the Fenton-like reagent comprises:
   a fourth component that is one or more selected from the group consisting of HCl, $H_2SO_4$, $HNO_3$, and $CH_3COOH$;
   a fifth component that is one or more selected from the group consisting of $FeCl_3$, $Fe_2(SO_4)_3$, $CuCl_2$, $CuSO_4$, $ZnCl_2$, and $ZnSO_4$; and
   a sixth component that is $H_2O_2$,
   wherein the skeleton builder is in the form of powder;
   wherein the skeleton builder is more than one selected from the group consisting of fly ash, magnesite, dead burned magnesia, waste fly ash, biomass particles, red mud, cement, phosphogypsum, and carbon powder;
   wherein a weight ratio of the Fenton's reagent and/or the Fenton-like reagent to the skeleton builder is 1: 0.05 to 300.

2. A method of dewatering a sludge with a sludge dewatering composite conditioner comprising:
   adding a Fenton's reagent and/or a Fenton-like reagent to a sludge slurry of the sludge, mixing them to carry out an oxidation reaction; and
   adding a skeleton builder to the sludge slurry containing the Fenton's reagent and/or the Fenton-like reagent, and stirring to obtain a mixture,
   wherein the Fenton's reagent comprises:
   a first component that is one or more selected from the group consisting of HCl, $H_2SO_4$, $HNO_3$ and $CH_3COOH$;
   a second component that is $FeCl_2$ and/or $FeSO_4$; and
   a third component that is $H_2O_2$,
   wherein the Fenton-like reagent comprises:
   a fourth component that is one or more selected from the group consisting of HCl, $H_2SO_4$, $HNO_3$ and $CH_3COOH$;
   a fifth component that is one or more selected from the group consisting of $FeCl_3$, $Fe_2(SO_4)_3$, $CuCl_2$, $CuSO_4$, $ZnCl_2$, and $ZnSO_4$; and
   a sixth component that is $H_2O_2$,
   wherein the skeleton builder is in the form of powder,
   wherein the skeleton builder is more than one selected from the group consisting of fly ash, magnesite, dead burned magnesia, waste fly ash, biomass particles, red mud, cement, phosphogypsum, and carbon powder, and
   wherein the second component and/or the fifth component is added at 0.5% to 50% by weight of a dry weight of the sludge slurry, the third component and/or the sixth component is added at 0.1% to 60% by weight of the dry weight of the sludge slurry, and the skeleton builder is added at 5% to 150% by weight of the dry weight of the sludge slurry.

3. The method of claim 2, wherein adding the Fenton's reagent and/or the Fenton-like reagent to the sludge slurry includes:
   adding the first component and/or the fourth component into the sludge slurry, and adjusting the pH of the sludge slurry to 2 to 7;
   adding the second component and/or the fifth component into the sludge slurry of pH of 2 to 7, then stirring for 1 to 3 minutes; and
   adding the third component and/or the sixth component into the sludge slurry containing the second component and/or the fifth component, then stirring for 10 to 90 minutes.

4. The method of claim 3, wherein the sludge is selected from the group consisting of blended sludge, dehydrated sludge, and paper sludge.

5. The method of claim 3, wherein a water content of the sludge slurry is 90 wt % to 99 wt %.

6. A method of dewatering a sludge, comprising:
   a) adding a first component and/or a fourth component into a sludge slurry of the sludge to adjust a pH value of the sludge slurry to 2 to 7 to obtain a first treated sludge slurry;
   b) adding a second component and/or a fifth component into the first treated sludge slurry and stirring for 1 to 3 minutes to obtain a second treated sludge slurry;
   c) adding a third component and/or a sixth component into the second treated sludge slurry to obtain a third treated sludge slurry; and
   d) adding a skeleton builder into the third treated sludge slurry and stirring to obtain a mixture,
   wherein the second component and/or the fifth component is added at 0.5% to 50% by weight of a dry weight of the sludge slurry,
   the third component and/or the sixth component is added at 0.1% to 60% by weight of the dry weight of the sludge slurry,
   the skeleton builder is added at 5% to 150% by weight of the dry weight of the sludge slurry,
   the first component is one or more selected from the group consisting of HCl, $H_2SO_4$, $HNO_3$ and $CH_3COOH$,
   the second component is $FeCl_2$ and/or $FeSO_4$,
   the third component is $H_2O_2$,
   the fourth component is one or more selected from the group consisting of HCl, $H_2SO_4$, $HNO_3$, and $CH_3COOH$,
   the fifth component is one or more selected from the group consisting of $FeCl_3$, $Fe_2(SO_4)_3$, $CuCl_2$, $CuSO_4$, $ZnCl_2$, and $ZnSO_4$,
   the sixth component that is $H_2O_2$,
   the skeleton builder is in the form of powder, and
   the skeleton builder is more than one selected from the group consisting of fly ash, magnesite, dead burned magnesia, waste fly ash, biomass particles, red mud, cement, phosphogypsum, and carbon powder.

7. The method of claim 6, wherein the fifth component is added at 0.5% to 5.4% by weight of the dry weight of the sludge slurry.

8. The method of claim 6, wherein the sixth component is added at 0.1% to 0.5% by weight of the dry weight of the sludge slurry.

9. The method of claim 6, wherein the skeleton builder is added at 5% to 50% by weight of the dry weight of the sludge slurry.

10. A method of dewatering a sludge with a sludge dewatering composite conditioner, comprising:

adding a Fenton-like reagent to a sludge slurry, mixing them to carry out an oxidation reaction; and adding a skeleton builder to the sludge slurry containing the Fenton-like reagent, and stirring to obtain a mixture, wherein the Fenton-like reagent comprises:
- a fourth component that is one or more selected from the group consisting of HCl, $H_2SO_4$, $HNO_3$, and $CH_3COOH$;
- a fifth component that is one or more selected from the group consisting of $FeCl_3$, $Fe_2(SO_4)_3$, $CuCl_2$, $CuSO_4$, $ZnCl_2$, and $ZnSO_4$; and
- a sixth component that is $H_2O_2$, wherein the skeleton builder is in the form of powder, wherein the skeleton builder is more than one selected from the group consisting of lime, fly ash, magnesite, dead burned magnesia, waste fly ash, biomass particles, red mud, cement, phosphogypsum, gypsum, carbon powder, and coal powder, and wherein the fifth component is added at 0.5% to 50% by weight of a dry weight of the sludge slurry, the sixth component is added at 0.1% to 60% by weight of the weight of the sludge slurry, and the skeleton builder is added at 5% to 150% by weight of the dry weight of the sludge slurry.

11. A method of dewatering a sludge, comprising:

adding a fourth component into a sludge slurry of the sludge, and adjusting the pH of the sludge slurry to 2 to 7 to obtain a first treated sludge slurry;

adding a fifth component into the first treated sludge slurry, then stirring for 1 to 3 minutes to obtain a second treated sludge slurry;

adding a sixth component into the second treated sludge slurry, then stirring for 10 to 90 minutes to obtain a third treated sludge slurry; and adding a skeleton builder to the third treated sludge slurry, wherein the fourth component is one or more selected from the group consisting of HCl, $H_2SO_4$, $HNO_3$, and $CH_3COOH$, wherein the fifth component is one or more selected from the group consisting of $FeCl_3$, $Fe_2(SO_4)_3$, $CuCl_2$, $CuSO_4$, $ZnCl_2$, and $ZnSO_4$, wherein the sixth component is $H_2O_2$, wherein the skeleton builder is in the form of powder, wherein the skeleton builder is more than one selected from the group consisting of lime, fly ash, magnesite, dead burned magnesia, waste fly ash, biomass particles, red mud, cement, phosphogypsum, gypsum, carbon powder, and coal powder, and wherein the fifth component is added at 0.5% to 50% by weight of a dry weight of the sludge slurry, the sixth component is added at 0.1% to 60% by weight of the dry weight of the sludge slurry, and the skeleton builder is added at 5% to 150% by weight of the dry weight of the sludge slurry.

12. The method of claim 11, wherein the sludge is selected from the group consisting of blended sludge, dehydrated sludge, and paper sludge.

13. The method of claim 11, wherein a water content of the sludge slurry is 90 wt % to 99 wt %.

* * * * *